United States Patent [19]
Dickey et al.

[11] Patent Number: 5,094,279
[45] Date of Patent: Mar. 10, 1992

[54] COPING JIG

[76] Inventors: John W. Dickey, Rte. 1, Box 22A, Donnelly, Minn. 56235; Mark T. Dickey, 17078 Heather St. NW., Andover, Minn. 55304

[21] Appl. No.: 638,348

[22] Filed: Jan. 7, 1991

[51] Int. Cl.$^5$ ................................................ B27C 5/10
[52] U.S. Cl. ........................... 144/144 R; 144/134 A; 144/137; 144/372; 409/130
[58] Field of Search ............... 144/134 D, 136 C, 137, 144/134 A, 144 R, 371, 372, 142; 409/130, 182, 125

[56] References Cited

U.S. PATENT DOCUMENTS

| | | | |
|---|---|---|---|
| 3,109,466 | 11/1963 | Jones | 144/144 R |
| 4,356,849 | 11/1989 | Fredrickson | 144/144 R |
| 4,579,158 | 4/1986 | O'Meara | 144/144 R |
| 4,871,002 | 10/1989 | Turner | 144/144 R |

Primary Examiner—W. Donald Bray
Attorney, Agent, or Firm—Patterson & Keough

[57] ABSTRACT

A coping jig for making cuts for forming an inside corner for trim boards, particularly baseboard moldings, includes a clamping plate having an integral backing plate along the length of one side and a generally central opening. Right and left workpiece toggle clamps are operably coupled to the underside of the clamping plate on both sides of the opening. A clamping block is secured to the upper side of the clamping plate on each side of the opening. A flat router stage with an opening therethrough is mounted on the clamping blocks with the opening generally between the blocks. A die clamp is operably coupled to each block for holding a selected pattern between each die clamp and the associated block.

8 Claims, 4 Drawing Sheets

U.S. Patent   Mar. 10, 1992   Sheet 1 of 4   5,094,279
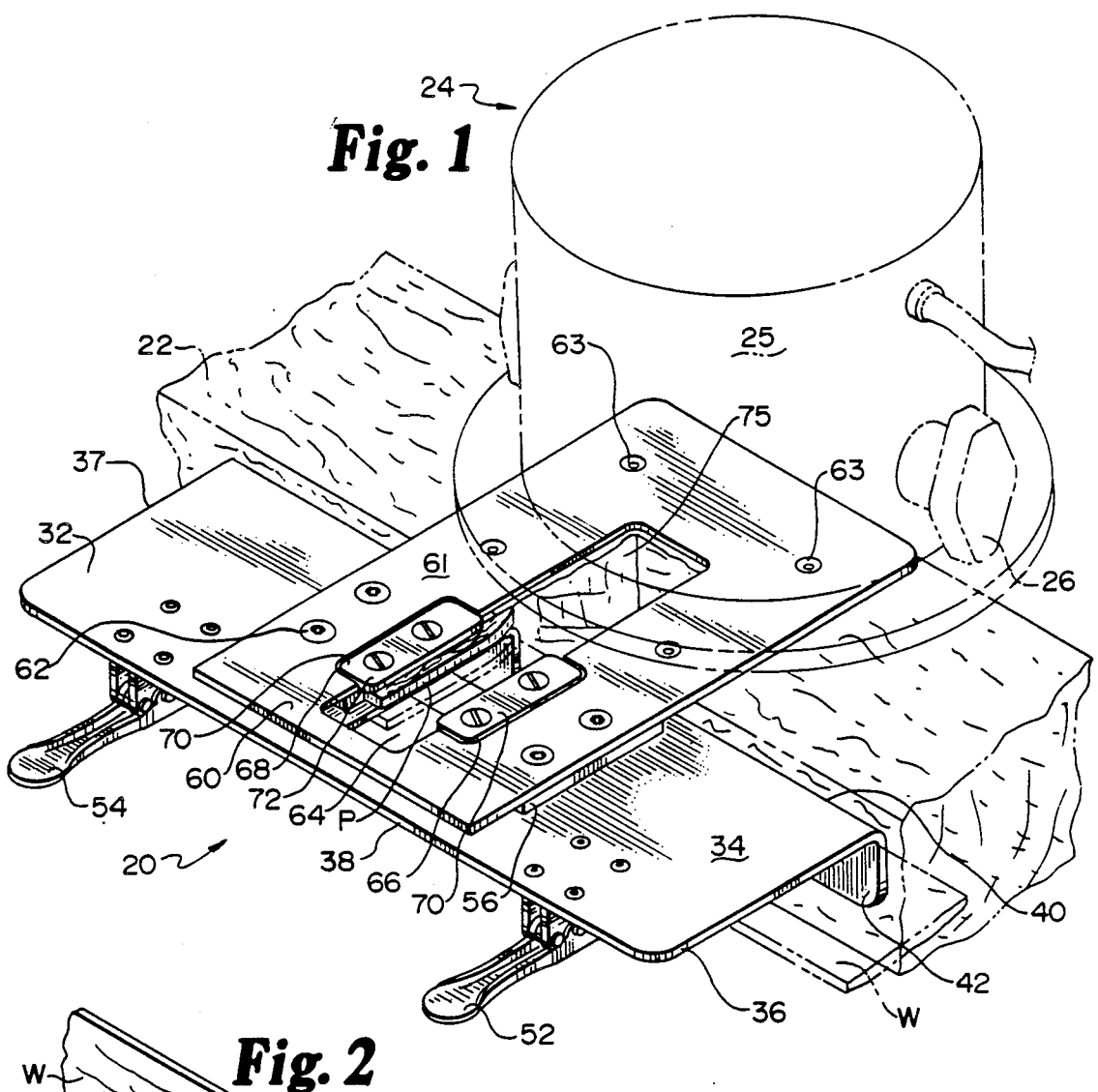
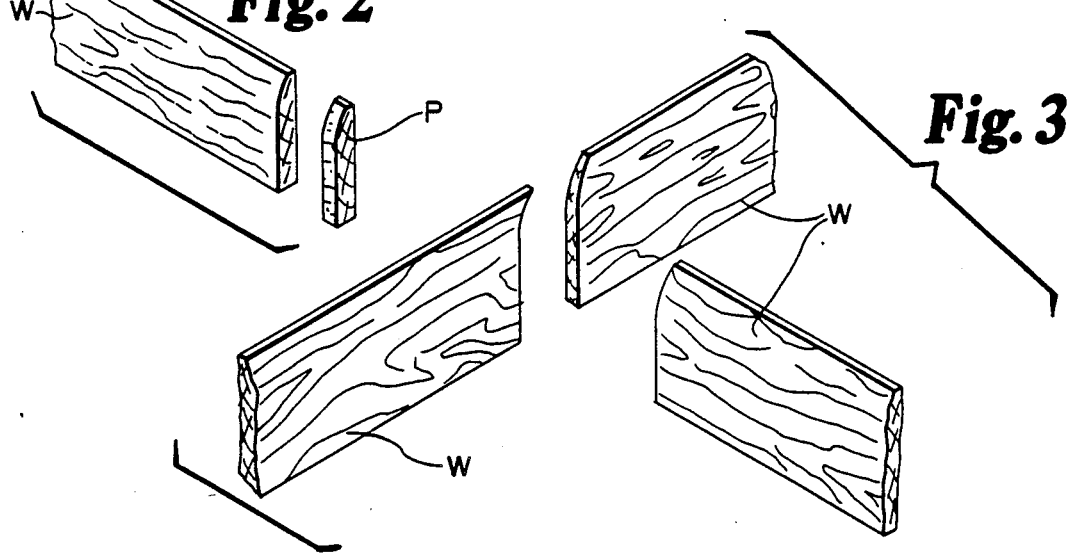

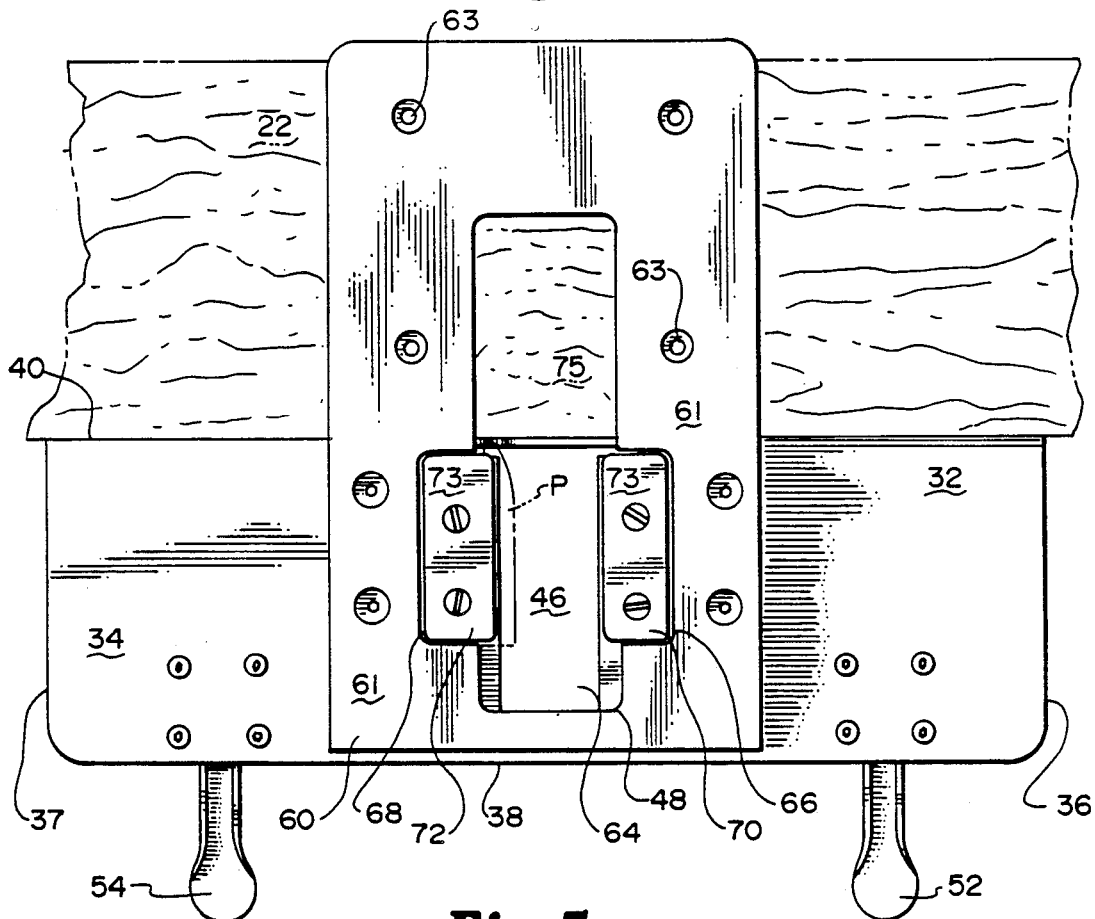
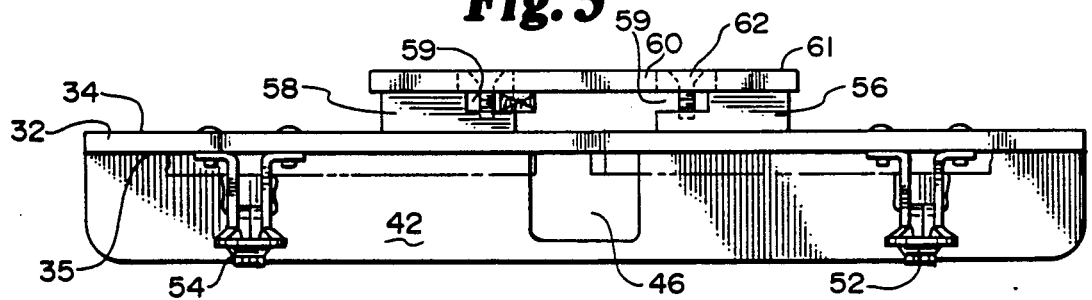
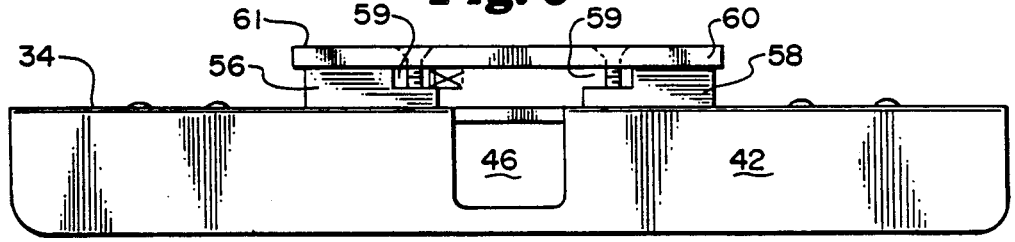

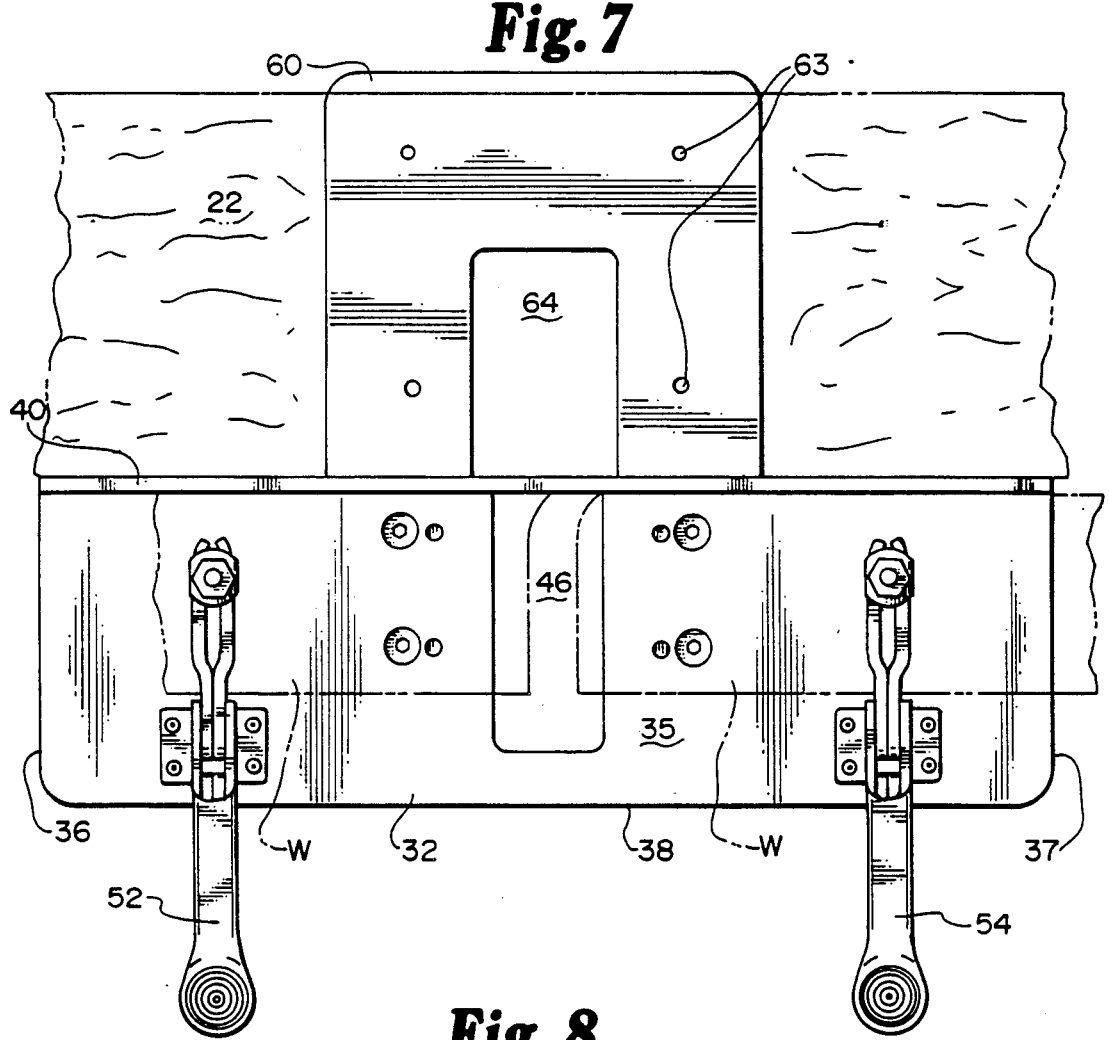
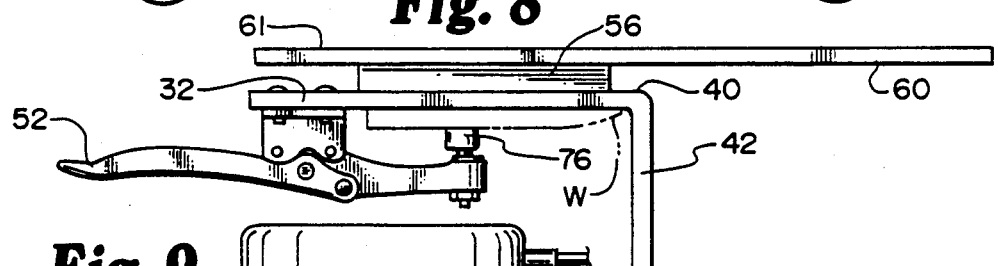
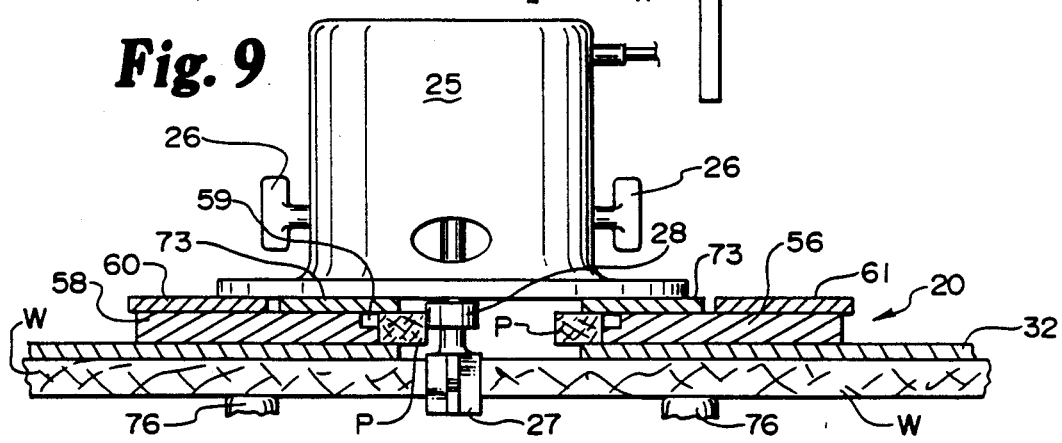

COPING JIG

TECHNICAL FIELD

The present invention relates to jigs or workpiece and pattern holders. In particular, it relates to a jig for preparing intersecting corners or joints for trim boards of moldings, wherein the jig may be used with a variety of trim boards and easily may be carried to and from worksites.

BACKGROUND OF THE INVENTION

A jig is a device used generally to maintain the correct positional relationship between workpiece and a tool or between workpieces and parts of workpieces during assembly. The advantages of using jigs include obtaining more precise fits between workpieces when installed or assembled, repeatability in operations and standardization of products. Jigs are particularly useful in the construction trades, especially for finish woodworking, for making joints, including joints in moldings and trim boards.

One example of a portable jig for use in construction trades is provided by U.S. Pat. No. 4,629,171, disclosing a portable jig for assembling prefabricated building structures, particularly walls or similar structures. As with most jigs, an object of the '171 invention is to provide a means for assembling workpieces, in this instance walls, floors or similar structures, with ease, accuracy and low economic outlay. The disclosed jig basically comprises a plurality of cooperating tubular members and clamping members whereby a wall can be arranged in the necessary configuration for assembly.

Specialized jigs have been developed for specific purposes in construction finishing. The jig and template apparatus disclosed in U.S. Pat No. 4,102,374 is for preparing corner inserts for laminated plastic countertops. The apparatus includes a pair of scaffolds for supporting a countertop, male and female templates, and pneumatic cylinders for holding the countertops and templates together.

There are many commercially available general purpose templates and cutting guides including dovetail or box joint jigs, shelf drilling jigs, mortise and tenon jigs and various other jigs and templates. Many of these are designed to be used with a router. A router is a cutting tool comprising a base and a high-speed motor fitted thereon to rotate a cutting bit. A split collet chuck secures the bit and the depth of cut is adjusted by raising or lowering the motor in the base. Routers are commonly used to cut joints such as the dado, rabbit and mortis and tenon joints, to form or trim decorative edges, and to make molding or trim boards. The '374 patent discloses that the jig and template apparatus therein may be used with a router as the cutting tool.

Dispite the profusion of jigs and templates, there are some problems which have been unaddressed in the prior art. One such problem is to combine easy, convenient portability with a high degree fo repeatability and durability. A jig should be able to be moved very easily from workplace to workplace, occupy minimal set-up time, and yet ensure that work product accuracy and precision are not diminished.

Another problem is that many available jigs and templates require separate or supplementary clamping devices for holding the workpieces or templates. Such clamps are misplaced or forgotten easily and complicate transportation problems.

Known jigs and other equipment for making joints, such as miter boxes, address some of these problems and represent advances in the art. Such equipment may be used to produce stylized joints with an adequate degree of repeatability, but can not produce a customized joint, tailored to onsite factors such as the relationship, alignment and quality of the material and location of the workpiece.

With specific regard to preparing joints in molding and trim boards, particularly joints at baseboard inside corners, efficiency and economy would improve, along with precision, if an easily portable jig were available.

An easily portable coping jig for making joints in moldings and trim boards as precisely and accurately as possible, yet as quickly and efficiently as possible, would be a decided improvement over the jigs disclosed in the prior art.

SUMMARY OF THE INVENTION

A coping jig for making cuts for forming inside corners for trim boards, particularly baseboard moldings, includes a clamping plate with an integral backing plate along the length of one side. The clamping plate has a generally central opening. Right and left workpiece toggle clamps are operably coupled to the underside of the clamping plate on both sides of the central opening. A clamping block is secured to opposed sides of the clamping plate opening.

A router stage having a stage central opening is secured to the clamping blocks so that the stage opening is substantially aligned with at least a portion of the opening in the clamping plate. A clamping blade or die clamp is secured to each clamping block. A selected pattern or template is held by the clamping blades at opposed sides of the aligned openings.

The stage includes a pluralilty of connector receiving apertures so the coping jig may be mounted on a suitable base or support. The coping jig is designed to be used with a cutting tool, such as a router or the like.

The present invention is designed specifically to enable precise, repeatable cuts for making coped joints and saves substantial time in the making of such joints. Additionally, the jig enables semi-skilled laborers to make coped joints easily and quickly. The coping jig of the present invention reduces material waste and, because the templates or patterns used with the jig are from the actual joint site, the present invention compensates for irregularities or special conditions.

The present invention is easy to use, easily carried from worksite to worksite, and may conveniently be mounted to a support surface at the site.

BRIEF DESCRIPTION OF THE DRAWINGS

FIG. 1 is a perspective view of the present invention attached to a support, with a cutting tool depicted in phantom lines;

FIG. 2 is an exploded fragmentary view depicting the selection of a pattern or template;

FIG. 3 is an exploded fragmentary view depicting the alignment of moldings at a corner;

FIG. 4 is a top plan view of the present invention;

FIG. 5 is a front elevational view of the invention;

FIG. 6 is a rear elevational view of the invention;

FIG. 7 is a bottom plan view of the jig of the present invention;

FIG. 8 is a side elevational view of the jig;

FIG. 9 is a sectional diagram of the jig depicting a cutting tool making a cut in a workpiece;

DETAILED DESCRIPTION OF THE PREFERRED EMBODIMENT

The coping jig 20, in accordance with the present invention, is depicted in FIG. 1 installed on a supporting timber 22. A router 24 is depicted in phantom lines positioned to make a cut guided by the coping jig 20.

Figure 10:
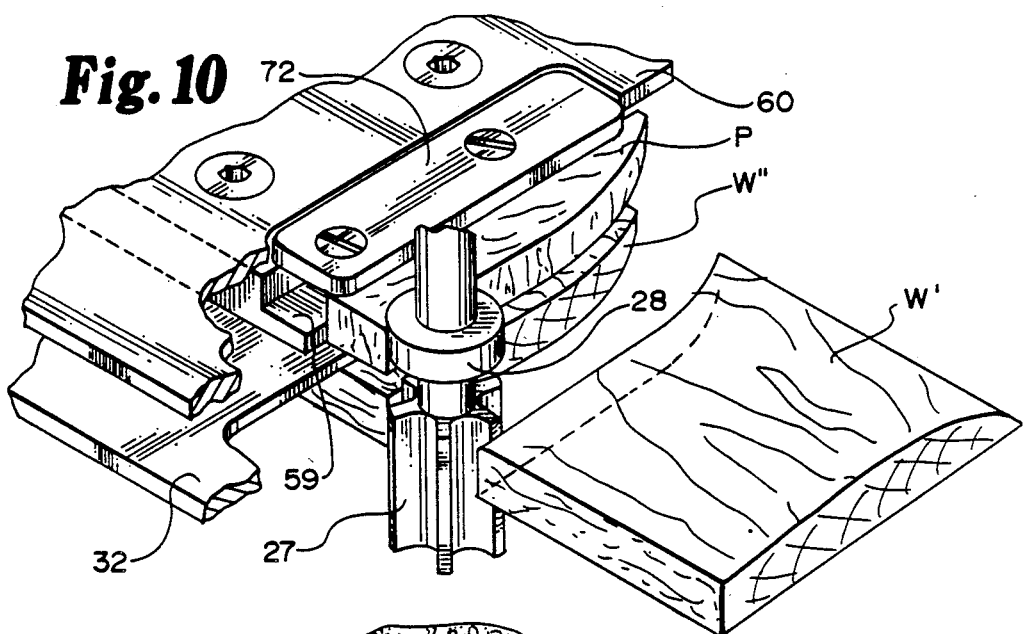
FIG. 10 is a fragmentary perspective view depicting a completed cut in a trim board.

FIGS. 9 and 10 show additional features of the router 24, including the housing 25, hand grips 26, a mounted pattern bit 27, and a bearing guide 28. The depicted router 24 is commonly and commercially available; the pattern bit 27 may be selected from available pattern bits as required. Although a router 24 is depicted as the cutting tool of choice for use with the coping jig 20, it is not beyond the scope of the present invention that other cutting tools such as coping saws or drill presses might be used to form the desired joint or design in the workpiece.

With further reference to FIGS. 1 and 4, the coping jig 20 of the present invention includes a clamping plate 32. The plate 32 is generally rectangular and has a top side 34, an underside 35, opposed end edges 36,37, a front edge 38, and a back edge 40. At the back edge 40, the plate 32 is bent along the length of edge 40 to form a backing plate 42 at approximately 90° to the plane of the plate 32. The clamping plate 32 has a generally central opening 46. The opening 46 is spaced from the front edge 38 of the clamping plate 32 and extends through the bend at edge 40 and into the backing plate 42 as depicted in FIGS. 5 and 6.

A pair of workpiece toggle clamps 52, 54 are fixedly mounted on the underside 35 of the plate 32 at either side of the opening 46, between the periphery 48 thereof and the end edges 36, 37 of the plate 32.

Referring to FIGS. 5 and 6, a pair of generally L-shaped clamping blocks 56, 58 having an inset area 59 are mounted on the top side 34 of the plate 32 at opposite sides of the opening 46. The clamping blocks 56, 58 may be secured to the clamping plate 32 by various suitable means, including rivets, flathead screws or welding.

A second upper plate or router stage 60 is connectrd to the top of the pair of clamping blocks 56, 58. The stage 60 is generally rectangular and has a flat, smooth upper surface 61 parallel to the plate 32. A rectangular stage opening 64 is located in the generally central area of the stage 60. The opening 64 includes a pair of opposed, lateral extensions 66, 68 overlying the inset area 59 in the clamping blocks 56, 58 and extending into the stage 60 beyond the relatively longer sides of the otherwise regular, rectangular periphery of the stage opening 64. Appropriate means, in this instance flathead screws 62, may be used to secure the stage 60 to the the clamping blocks 56, 58 and the stage 60 has a plurality of fastener receiving apertures 63 for attaching the jig 20 to a support (22 in FIG.1).

A clamping blade or die clamp 70, 72 is removably mounted in each of the extensions 66, 68 by attaching the die clamp 70,72 to the upper surface of the inset area 59 of the clamping blocks 56, 58. The die clamps 70, 72 are generally rectangular, filling the extensions 66, 68 and extending into the stage opening 64. The die clamps 70, 72 have a flat outwardly facing surface 73 coplanar with or slightly beneath the upper surface 61 of the stage 60 when a clamp 70, 72 is secured to a clamping block 56, 58. Although the depicted die clamps 70, 72 have a single, selected thickness, the clamps 70, 72 may have varying thicknesses for accommodating a particular workpiece and pattern thickness.

Referring to FIGS. 7, 8 and 9, a workpiece W is held in place by the toggle clamps 52, 54 against the underside 35 of the clamping plate 32. The router 24, and specifically the guide 28 and the blade 26, are depicted in relationship to the workpiece W and to the pattern P after the pattern P is clamped in place by the die clamps 70, 72.

FIG. 8 depicts the toggle clamps 52, 54 holding a workpiece W in place. Each clamp 52, 54 includes a compressible, workpiece contacting foot 76. The toggle clamps 52, 54 are lockable over-the-center pivot clamps, but any commercially available suitable clamp may be used. Only two clamps 52, 54 are depicted; however, it is within the scope of the present invention that more clamps be carried by the plate 32.

With further reference to FIGS. 1, 9 and 10, the use of the coping jig 20 is depicted. The coping jig 20 is mounted, by conventional fasteners received in apertures 63, on a timber or other appropriate support 22 at a worksite. The router 24 is used to form a router well 75 in the support 22 within the confines of the stage opening 64.

A workpiece W is positioned against the backing plate 42 and between the clamping plate 32 and the toggle clamps 52, 54, and is clamped in place. A pattern P is obtained from a workpiece W (as depicted in FIGS. 2 and 3) and clamped in the inset area 59 of the clamping blocks 56, 58, more specifically between the die clamps 70, 72 and the blocks 56, 58.

FIG. 9 depicts the router 24 inserted in the router well 75 and perpared to make a cut through the workpiece W. FIG. 10 depicts the wordpiece W cut and it should be appreciated that the cut, producing workpieces W' and W''', precisely follows the edge of the pattern P because the router roller guide 28 contacted and followed the pattern P during the cutting.

Figure 11:
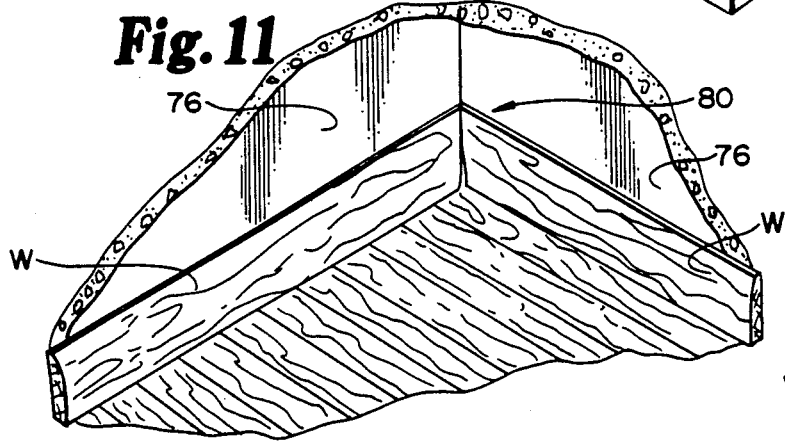
FIG. 11 is a fragmentary perspective view of a corner of a room wherein a prior art miter cut was made to form the joint between trim boards at a corner.
Figure 12:
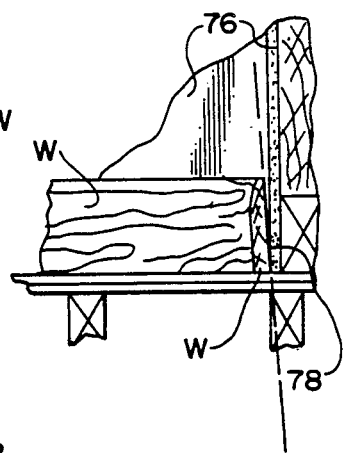
FIG. 12 is a fragmentary sectional view of the joint depicted in FIG. 11.

FIGS. 11 and 12 depict a common problem encountered when prior art methods are used to form joints for moldings or trim boards. Specifically, FIG. 12 depicts the effect of site irregularities and material qualities on such joints. The wallboard or gypsum board sheeting 76 covering the wall has a tapered area 78 at the bottom. If a prior art miter box jig (not depicted) is used to make a corner joint in a molding for use on such sheeting 76, the tapered area 78 causes a gapped joint 80 as depicted in FIG. 11.

Figure 13:
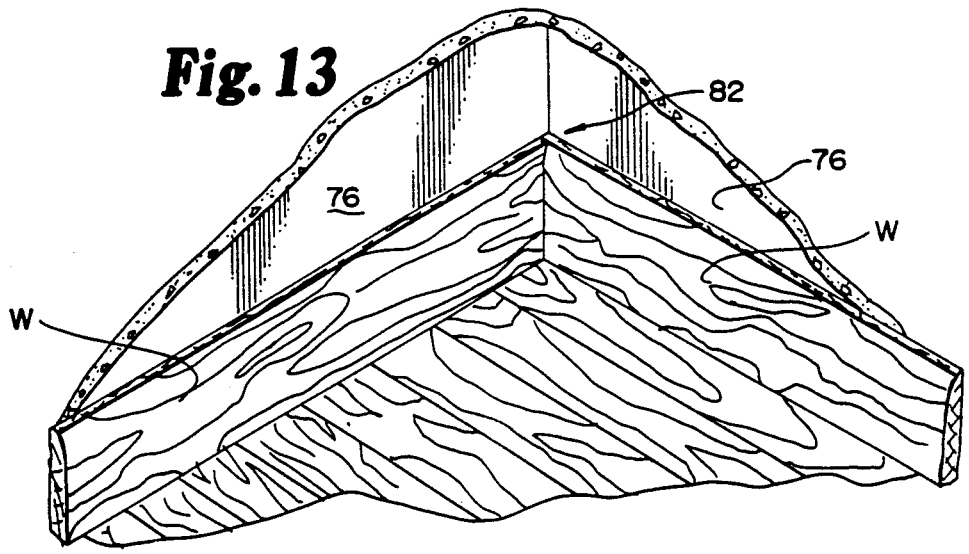
FIG. 13 is a fragmentary perspective view of a trim joint at the corner of a room wherein the joint at the intersection of the trim boards was formed by the present invention.

FIGS. 3 and 13 depict a joint 82 formed using the present invention. The jig 20 allows a woekpiece to be positioned to compensate for the tapered area 78 of the gypsum board to produce the corner joint depicted in FIG. 13, wherein there are no gaps. Additionally, the benefit of such a joint is that even if the wood shrinks as it dries, the joint will still tend to look as depicted in FIG. 13.

Briefly restating the use of the coping jig 20, the jig 20 is mounted to a support 22 and a router well 75, conforming to the opening 64, is formed. Patterns P are selected (depicted in FIG. 2) and installed in the jig 20 on each side of the router well 75. A workpiece is positioned under the clamping plate 32 against the backing plate 42. The toggle clamps 52, 54 are closed to hold the workpiece W securely in place. The router is positioned as depicted in FIG. 9, started, and and as the cut is made, the guide bearing 28 follows the pattern P, reproducing the exact curve of the pattern P. If the corners are not square (depicted in FIGS. 11 and 12), the workpiece W or the pattern P can be adjusted at the appropriate angle before being clamped.

Generally, the corner joint (FIG. 13) may be cut first and then the molding or trim board may be cut to length. In any one particular room, the user may start in one corner and proceed around the room, easily shifting the jig 20 for convenience.

Any suitable material, metals, alloys thereof, fiberglass or plastics, may be used to form all or a portion of the coping jig 20, provided that the selected material is sufficiently rigid and strong. The clamping blocks 56, 58 may be provided in various sizes to compensaate for different thicknesses of workpieces and the upper surface of the stage 60 may be coated with selected materials to facilitate the movement of the router 24 thereon. Although the preferred embodiment of the coping jig 20 is designed to be attached to any available support at a site, it is not beyond the scope of the present invention that the coping jig 20 be integrated with a folding table or work bench (not depicted).

What is claimed is:

1. A coping jig for making joints in moldings comprising:
    a clamping plate having a top side and an opposed bottom side and having structure defining an opening having opposed lateral sides;
    clamping means for holding a molding, said clamping means carried by said plate, said clamping means being oriented adjacent said opposed lateral sides of said opening;
    clamping blocks carried by said plate on the side of the plate opposite the side carrying said clamping means, said blocks being oriented adjacent said opposite sides of said opening;
    a router stage coupled to said blocks, said stage having a flat upper surface generally parallel to said plate and a generally central opening substantially aligned with the opening in said plate; and
    a clamping blade operably coupled to each of said blocks and spaced therefrom to the extent that the top of each blade is generally coplanar with or below said upper surface of said stage.

2. The coping jig according to claim 1, wherein said clamping plate is generally flat.

3. The coping jig according to claim 2, wherein said clamping means comprises a toggle clamp.

4. The coping jig according to claim 1, wherein said router stage includes apertures for receiving attachment means for removably attaching said jig to a support.

5. The coping jig according to claim 1, wherein said opening in said router stage is generally rectangular, including bilateral extensions for receiving said clamping blades.

6. A jig for use with a router comprising:
    operably coupled, spaced parallel plates each with a generally central opening, said openings substantially aligned for receiving a router cutting bit;
    means for releasably holding a template substantially between said plates at the periphery of said openings; and
    means for releasably holding a workpiece adjacent one of the outer surfaces of said parallel plates and at the periphery of said opening,
    wherein said plates are held in spaced parallel relationship by a pair of blocks operably coupled to said plates and wherein said means for holding said template comprises a clamping blade operably coupled to one of said blocks.

7. A jig for use with a router comprising:
    operably coupled, spaced parallel plates each with a generally central opening, said opening substantially aligned for receiving router cutting bit;
    means for releasably holding a template substantially between said plates at the periphery of said openings; and
    means for releasably holding a workpiece adjacent one of the outer surfaces of said parallel plates and at the periphery of said openings, wherein said means for holding a workpiece comprises a toggle clamp operably coupled to an outer surface of one of said plates.

8. A jig for use with a router having a cutting element for cutting a workpiece, comprising:
    plate means presenting a plate margin;
    means operably coupled to said plate means for releasably, fixedly positioning said workpiece adjacent said plate margin for cutting engagement of said workpiece by said cutting element; and
    clamping means operably coupled to said plate means for releasably holding said template adjacent said plate margin for guiding engagement of said cutting element by said template,
    said clamping means comprising a clamping element spaced apart from said plate means and holding means for selectively urging said clamping element toward said plate means, whereby said template can be interposed and held between said clamping element and said plate means.

* * * * *